US012546709B2

(12) United States Patent
Liu et al.

(10) Patent No.: US 12,546,709 B2
(45) Date of Patent: Feb. 10, 2026

(54) QUANTIFICATION OF TARGET ANALYTE BASED ON MULTI-LAYER MULTI-VARIANT SPECTRA ANALYSIS FOR SPECTROSCOPIC ANALYZERS

(71) Applicant: Endress+Hauser Optical Analysis, Inc., Ann Arbor, MI (US)

(72) Inventors: Xiang Liu, Rancho Cucamonga, CA (US); Kuan-Ting Yeh, Rancho Cucamonga, CA (US); Chih-Husan Chang, Rancho Cucamonga, CA (US); Utsav Kc, Rancho Cucamonga, CA (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 159 days.

(21) Appl. No.: 18/532,680

(22) Filed: Dec. 7, 2023

(65) Prior Publication Data

US 2024/0219298 A1 Jul. 4, 2024

Related U.S. Application Data

(60) Provisional application No. 63/436,302, filed on Dec. 30, 2022.

(51) Int. Cl.
*G01N 21/31* (2006.01)
*G01N 21/03* (2006.01)
(Continued)

(52) U.S. Cl.
CPC ....... *G01N 21/3103* (2013.01); *G01N 21/274* (2013.01); *G01N 21/031* (2013.01);
(Continued)

(58) Field of Classification Search
CPC ............ G01N 21/3103; G01N 21/274; G01N 21/031; G01N 21/05; G01N 21/39;
(Continued)

(56) References Cited

U.S. PATENT DOCUMENTS 5,121,337 A * 6/1992 Brown ............... G01N 21/3504
702/28
7,586,094 B2 9/2009 Liu et al.
(Continued)

FOREIGN PATENT DOCUMENTS

EP 3488225 A1 5/2019

*Primary Examiner* — Tarifur R Chowdhury
*Assistant Examiner* — Kaitlyn E Kidwell
(74) *Attorney, Agent, or Firm* — Gil M. Repa; Endress+Hauser (USA) Holding, Inc.

(57) ABSTRACT

A method of spectroscopic analysis includes: collecting a set of calibration spectra for calibration gas samples by scanning a sample range of wavelengths; calculating a first concentration of a target analyte and first concentrations of background components for each calibration spectrum using a multivariant algorithm; modeling an ideal concentration of the target analyte as a function of the first concentrations using a correlative model; collecting a field spectrum for an unknown field gas sample, wherein the field gas sample includes the target analyte and at least some of the background components; calculating a second concentration of the target analyte and second concentrations the background components for the field spectrum using the multivariant algorithm; correcting the second concentration of the target analyte using the correlative model and second concentrations of the background components; and determining a corrected target analyte concentration in the field gas sample based on the corrected second concentration.

20 Claims, 5 Drawing Sheets

(51) Int. Cl.
*G01N 21/05* (2006.01)
*G01N 21/17* (2006.01)
*G01N 21/27* (2006.01)
*G01N 21/33* (2006.01)
*G01N 21/35* (2014.01)
*G01N 21/39* (2006.01)
*G01N 21/65* (2006.01)
*G06F 17/18* (2006.01)

(52) U.S. Cl.
CPC ..... *G01N 21/05* (2013.01); *G01N 2021/1704* (2013.01); *G01N 21/27* (2013.01); *G01N 21/33* (2013.01); *G01N 2021/3595* (2013.01); *G01N 21/39* (2013.01); *G01N 2021/391* (2013.01); *G01N 2021/399* (2013.01); *G01N 21/65* (2013.01); *G01N 2201/129* (2013.01); *G01N 2201/1296* (2013.01); *G06F 17/18* (2013.01)

(58) Field of Classification Search
CPC ................... G01N 21/33; G01N 21/65; G01N 2021/1704; G01N 2021/3595; G01N 2021/391; G01N 2021/399; G01N 2201/129; G01N 2201/1296; G01N 21/27; G06F 17/18
See application file for complete search history.

(56) References Cited

U.S. PATENT DOCUMENTS

| | | | |
|---|---|---|---|
| 7,679,059 | B2 | 3/2010 | Zhou |
| 7,704,301 | B2 | 4/2010 | Zhou et al. |
| 8,976,358 | B2 | 3/2015 | Feitisch et al. |
| 10,643,008 | B2 | 5/2020 | Liu et al. |
| 10,739,255 | B1 | 8/2020 | Kirchnavy |
| 2008/0179530 | A1* | 7/2008 | Liu .................. G01N 21/3504 250/343 |
| 2012/0065948 | A1 | 3/2012 | Tan et al. |
| 2016/0132617 | A1* | 5/2016 | Liu .......................... G01J 3/44 703/2 |
| 2017/0038257 | A1 | 2/2017 | Liu et al. |
| 2021/0318280 | A1* | 10/2021 | Ludlum ............. G01N 33/0036 |

* cited by examiner

QUANTIFICATION OF TARGET ANALYTE BASED ON MULTI-LAYER MULTI-VARIANT SPECTRA ANALYSIS FOR SPECTROSCOPIC ANALYZERS

CROSS-REFERENCE TO RELATED APPLICATION

The present application is related to and claims the priority benefit of U.S. Provisional Patent Application No. 63/436,302, filed Dec. 30, 2022, the entire contents of which are incorporated herein by reference.

TECHNICAL FIELD

The present disclosure generally relates to methods for using spectroscopic analyzers and, in particular, to methods and systems for detection and quantification of target gas analytes using a spectroscopic analyzer.

BACKGROUND

Quantitative measurement of one or more target analytes using, for example, an absorption spectroscopic analyzer is affected by the background stream composition (e.g., concentrations of other components in the sample gas other than the target analytes), due to collisional broadening effects and/or structural interferences.

Gas mixture composition changes can cause apparent changes in collisional broadening and structural spectral interferences to the measured absorption properties of the target analyte even when the concentration of the target analyte itself remains constant. Many types of spectroscopic analyzers are susceptible to such errors caused by the changes in the background composition of the sample under test.

Methods to correct for background composition changes known in the art include, as patented in U.S. Pat. No. 7,586,094, measuring the most dominant background component at a reference wavelength region where the target analyte barely has absorptions. Then use this measured concentration of the most dominant background component to correct for the target analyte concentration measured at the target wavelength region where both the target analyte and the background component have absorptions. This works well only for a binary gas mixture (e.g., H2O in CH4). For gas streams with complex background compositions (e.g., $H_2O$ in natural gas with 50-100% $CH_4$, 0-20% $C_2H_6$ and 0-20% $CO_2$), it's very hard to find a reference wavelength region that only the most dominant background component (e.g., $CH_4$) has absorption while other background components (e.g., $C_2H_6$ and $CO_2$) do not. Natural gas is a naturally occurring mixture of gaseous hydrocarbons consisting primarily of methane ($CH_4$) in addition to smaller amounts of other higher alkanes, carbon dioxide, nitrogen, hydrogen sulfide, helium, and other compounds.

Figure 3:
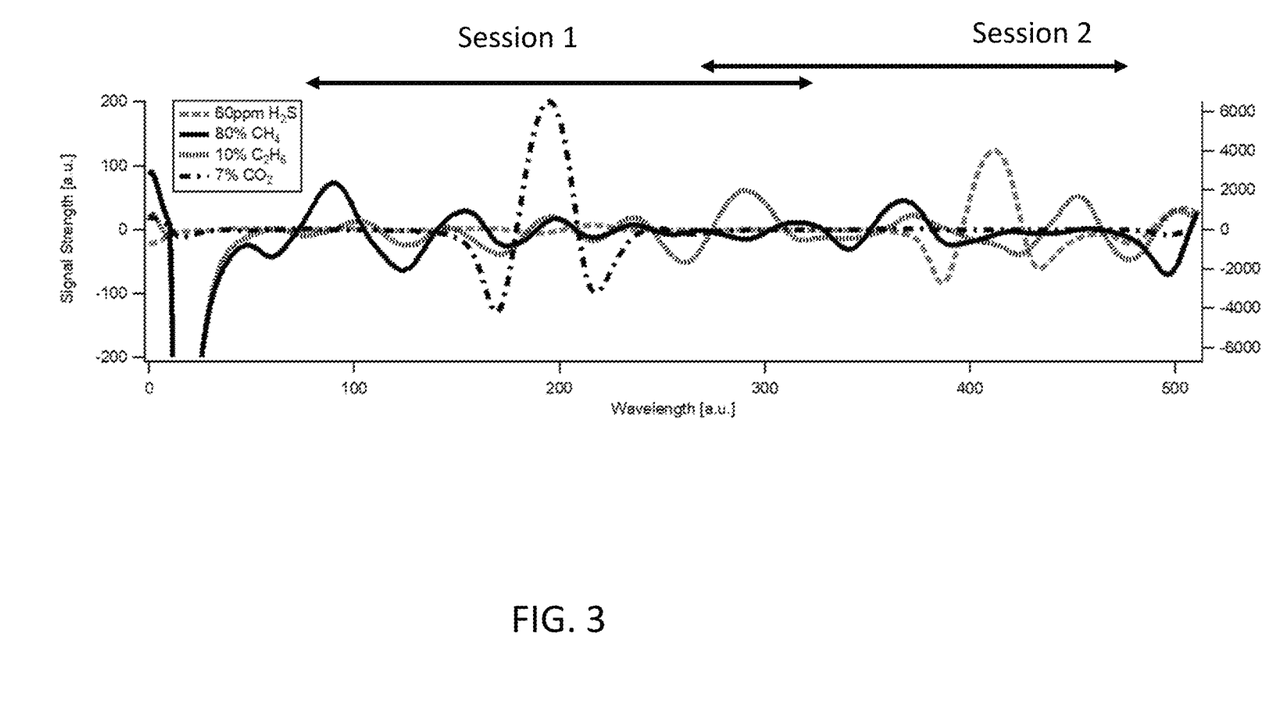
FIG. 3 shows a graph of exemplary absorption peaks of various analytes across a range of wavelengths according to a method of the present disclosure.

For gas streams with complex background compositions, usually the measured spectra contain multiple absorption peaks from the target analytes and dominant background component(s). Each absorption peak is usually not isolated from other peaks. Instead, these peaks partially overlap and thus interfere with one another, for example, as shown in FIG. 3. Conventionally, some multi-variant analysis algorithm is used to calculate the concentrations of multiple components including the target analyte(s) and the dominant background components. For example, the measured spectra can be decomposed into combinations of individual absorption peaks of multiple components using classical least squares regression (CLS) or multivariate linear regression (MLR) algorithms. Alternatively, chemometrics algorithms such as partial least squares regression (PLS) or inverse least squares regression (ILS), or artificial neural network (ANN) and machine learning (ML) algorithms can be used to derive the concentrations of multiple components at the same time. However, these algorithms when used alone usually cannot completely eliminate the influences of background components on the measurements of the target analytes.

U.S. Pat. No. 7,704,301 patented a differential scheme by periodically switching gas samples through a scrubber which only selectively remove the target analyte without changing the rest of the stream composition. The spectra of the "analyte-removed" gas stream are thus periodically measured and subtracted from the more-frequently measured spectra of the total gas stream, resulting in differential spectra which are mostly dominated by the absorption peaks of the target analyte. This is an effective way to eliminate background absorption peaks but requires consumables (the scrubbing medium) and stream switching mechanics.

U.S. Pat. No. 8,976,358 patented methods of correcting collisional broadening effects from background components via comparing measurements of validation gas mixture with factory saved calibrations. These methods only compensate for collisional broadening influences from background components, and require extra hardware such as validation cells, stream switching mechanics, scrubbers and permeation tubes, etc.

U.S. Pat. No. 10,643,008 patented methods of background compensation using background stream compositions measured by Raman, or FTIR, or gas chromatography. These methods can be effective but require using expensive and cumbersome devices that have to be synchronized with the main spectroscopic analyzer.

Accordingly, there remains a need for further contributions in this area of technology.

SUMMARY

In at least one aspect of the present disclosure, a method of compensating for the effects of spectral interferences and collisional broadening from background gas species to enable detection and quantification of target gas analytes using spectroscopic analyzers is disclosed.

The disclosed methods and systems generally improve the effectiveness of compensating for background interferences with multi-variate analysis algorithms, thus reducing qualification errors and increasing measurement accuracy and fidelity for measurements of trace analytes in complex and/or changing background compositions.

The disclosed methods and systems further generally reduce hardware complexity and thus costs relative to the state of the art.

In at least one aspect of the present disclosure, the method comprises: collecting a set of calibration spectra for a predefined set of calibration gas samples, respectively, using a spectroscopic analyzer by scanning a sample range of wavelengths, wherein the gas samples include a target analyte and selected background components; calculating a first concentration of the target analyte and first concentrations of the selected background components for each calibration spectrum using at least one multivariant analysis algorithm; modeling an ideal concentration of the target analyte as a function of the first concentrations of the target analyte and the selected background components using a correlative model; collecting a field spectrum for a field gas sample using the spectroscopic analyzer by scanning the sample range, wherein the field gas sample includes the target analyte and at least some of the selected background components; calculating a second concentration of the target analyte and second concentrations the selected background components for the field spectrum using the at least one multivariant analysis algorithm; correcting the second concentration of the target analyte using the correlative model and the second concentrations of the background components; and determining a corrected target analyte concentration in the field gas sample based on the corrected second concentration of the target analyte.

In such an embodiment, the target analyte is at least one of water ($H_2O$), hydrogen sulfide ($H_2S$) and carbon dioxide ($CO_2$). In a further embodiment, the target analyte is at least one of water vapor ($H_2O$), hydrogen sulfide ($H_2S$), other sulfur compounds, hydrogen chloride (HCl), hydrogen fluoride (HF), hydrogen bromide (HBr), hydrogen cyanide (HCN), ammonia ($NH_3$), arsine ($AsH_3$), phosphine ($PH_3$), oxygen ($O_2$), carbon monoxide (CO), carbon dioxide ($CO_2$), methane ($CH_4$), ethane ($C_2H_6$), ethylene ($C_2H_4$) and acetylene ($C_2H_2$).

In at least one embodiment, the selected background components include at least one of methane ($CH_4$), ethane ($C_2H_6$), heavier alkanes ($C_nH_{2n+2}$), carbon monoxide (CO), carbon dioxide ($CO_2$), elemental nitrogen ($N_2$), elemental oxygen ($O_2$), elemental hydrogen ($H_2$), heavier hydrocarbons, hydro-fluoro-carbons, hydro-chloro-carbons and hydro-fluoro-chloro-carbons.

In certain embodiments, the at least one multivariant analysis algorithm and/or the correlative model include at least one of a classical least square regression (CLS), a partial least square regression (PLS), a multivariate linear regression (MLR), an inverse least square regression (ILS), an artificial neural network and a machine learning algorithm.

In at least one embodiment, spectra of the set of calibration spectra are collected and/or analyzed during more than one session wherein: each session includes a subrange of wavelengths of the sample range; the at least one multivariant analysis algorithm includes a first algorithm and at least one further algorithm, each applied to spectra of a different session; the first algorithm is used to calculate the first concentration of the target analyte and/or the first concentration of at least one of the selected background components; and the at least one further algorithm is used to calculate the first concentrations of other background components of the selected background components.

In such an embodiment, the subranges of the sessions do not overlap each other. In further such embodiments, the subranges of the sessions at least partially overlap each other. In certain embodiments, each of the at least one multivariant analysis algorithm is mathematically the same algorithm. In alternative embodiments, at least one of the at least one multivariant analysis algorithm is a different algorithm mathematically. In an embodiment, the at least one further algorithm operates upon the first concentration of the target analyte and/or the first concentrations of at least one of the selected background components calculated using the first algorithm.

In at least one embodiment, the modeling yields a correlation between the ideal concentrations and the first concentrations of the target analyte using the first concentrations of the selected background components, which correlation results from structural interference and collisional broadening effects.

In at least one embodiment, the sample range of wavelengths scanned by the spectroscopic analyzer consists of +/−1 nanometer (nm) around a target wavelength of at least one of: 1371.0 nm, 1565.4 nm, 1569.9 nm, 1574.6 nm, 1576.3 nm, 1590.0 nm, 1914.1 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm, and 2665.1 nm.

In another aspect of the present disclosure, an apparatus for performing the method of the present disclosure comprises: a spectroscopic analyzer adapted to scan a sample range of wavelengths; and computer hardware including a programmable processor and memory storage, wherein the computer hardware is configured to perform operations comprising: collecting a set of calibration spectra for a predefined set of calibration gas samples, respectively, using the spectroscopic analyzer by scanning the sample range of wavelengths, wherein the gas samples include a target analyte and selected background components; calculating a first concentration of the target analyte and first concentrations of the selected background components for each calibration spectrum using at least one multivariant analysis algorithm; modeling the ideal concentration of the target analyte as a function of the first concentrations of the target analyte and the selected background components using a correlative model; collecting a field spectrum for a field gas sample using the spectroscopic analyzer by scanning the sample range, wherein the field gas sample includes the target analyte and at least some of the selected background components; calculating a second concentration of the target analyte and second concentrations the selected background components for the field spectrum using the at least one multivariant analysis algorithm; correcting the second concentration of the target analyte using the correlative model and the second concentrations of the background components; and determining a corrected target analyte concentration in the field gas sample based on the corrected second concentration of the target analyte.

In an embodiment, the spectroscopic analyzer includes an absorption spectroscopy subsystem, comprising a tunable diode laser. In a further embodiment, the spectroscopic analyzer includes a Raman spectroscopy subsystem.

In certain embodiments, the spectroscopic analyzer includes at least one: an absorption spectroscopy subsystem comprising a tunable diode laser, a quantum cascade laser or an intraband cascade laser (ICL); an absorption spectroscopy subsystem based on dispersive infrared or non-dispersive infrared (NDIR) spectrometry, Fourier transform infrared spectroscopy subsystem (FTIR), dispersive or non-dispersive ultraviolet (NDUV) spectroscopy subsystem; a cavity-enhanced absorption spectroscopy subsystem configured to enable optical-feedback cavity-enhanced absorption spectroscopy (OFCEAS), off-axis integrated cavity-output spectroscopy (OA-ICOS), or cavity ring-down (CRD) spectroscopy techniques; photoacoustic-based spectroscopy subsystem and/or analyzer; a dual-comb spectroscopy subsystem; and a Raman spectroscopy subsystem.

In a further embodiment, the spectroscopic analyzer includes a gas sampling subsystem configured to extract the field gas sample from a gas source, wherein the gas source is contained within a pipeline.

In at least one embodiment, the sample range of wavelengths the spectroscopic analyzer is adapted to scan consists of +/−1 nm around a target wavelength of at least one of: 1371.0 nm, 1392.5 nm, 1565.4 nm, 1569.9 nm, 1574.6 nm, 1576.3 nm, 1590.0 nm, 1871.1 nm, 1877.1 nm, 1914.1 nm, 1916.5 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm and 2665.1 nm.

In a further aspect of the present disclosure, a computer program product comprising a non-transitory machine-readable storage medium encoding instructions that, when executed by at least one programmable processor, cause the at least one programmable processor to perform operations comprising: collecting a set of calibration spectra for a predefined set of calibration gas samples, respectively, using a spectroscopic analyzer by scanning a sample range of wavelengths, wherein the gas samples include a target analyte and selected background components; calculating a first concentration of the target analyte and first concentrations of the selected background components for each calibration spectrum using at least one multivariant analysis algorithm; modeling the ideal concentration of the target analyte as a function of the first concentrations of the target analyte and the selected background components using a correlative model; collecting a field spectrum for a field gas sample using the spectroscopic analyzer by scanning the sample range, wherein the field gas sample includes the target analyte and at least some of the selected background components; calculating a second concentration of the target analyte and second concentrations the selected background components for the field spectrum using the at least one multivariant analysis algorithm; correcting the second concentration of the target analyte using the correlative model and the second concentrations of the background components; and determining a corrected target analyte concentration in the field gas sample based on the corrected second concentration of the target analyte.

In a yet further aspect of the present disclosure, a method of spectroscopic analysis for determining a concentration of at least one target analyte in a gaseous medium, the method comprising: passing a light having a wavelength through a sample volume of a gaseous medium including at least one target analyte, wherein the wavelength of the light is varied over a sample range of wavelengths; quantifying an intensity of the light after passing through the sample volume, wherein the intensity is recorded over the sample range of wavelengths to generate a measured spectrum; and determining a concentration of the at least one analyte based on the measured spectrum using at least one multivariant analysis algorithm, wherein the sample range of wavelengths scanned consists of +/−1 nm around a target wavelength of at least one of: 1371.0 nm, 1565.4 nm, 1569.9 nm, 1574.6 nm, 1576.3 nm, 1590.0 nm, 1914.1 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm, and 2665.1 nm, wherein the gaseous medium consists essentially of natural gas, and wherein the at least one analyte includes at least one of water vapor ($H_2O$), carbon dioxide ($CO_2$), and hydrogen sulfide ($H_2S$).

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

In the figures, the same features are identified by the same reference signs.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
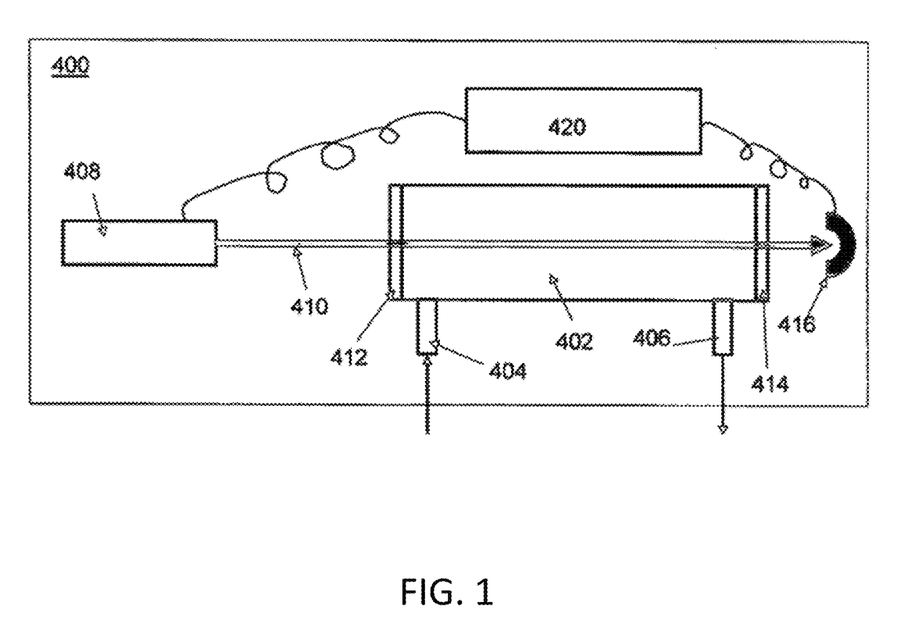
FIG. 1 shows schematic diagram of an analyzer according to the present disclosure.

FIG. 1 shows a schematic diagram of an analyzer 400 according to at least one embodiment of the present disclosure. In such an embodiment, a gas sample is contained within a sample cell 402, which defines an inner volume. The gas sample can be directed into the sample cell 402 via an inlet 404 and flushed from the sample cell 402 via an outlet 406. In some variations, the inlet 404 and the outlet 406 may include valves that can seal the inner volume of the sample cell 402 to obtain a static measurement of a fixed volume of gas. If there are no inlet and outlet valves, or if the inlet and outlet valves are open, the system can be used in a continuous or semi-continuous flow mode such as, for example, to continuously or semi-continuously monitor the concentration of a target analyte in a flowing gas stream. For continuous or semi-continuous operation, all or part of a gas stream can be directed into the sample cell 402 via the inlet 404 and flushed out of the sample cell 402 via the outlet 406 by the flowing stream of the gas. Flow through the sample cell 402 can be caused by a pressure differential created by a pump or some other mechanism.

A light source 408 is adapted to generate light having a range of wavelengths about at least a target wavelength in a continuous or pulsed beam 410 that is directed through the gas volume of the sample cell 402. In the example shown in FIG. 4, the sample cell includes windows 412 and 414 that allow the light beam 410 to enter and exit the cell 402. Other configurations are possible, including but not limited to those described in U.S. Pat. No. 7,679,059 B2, the disclosure of which is incorporated by reference in its entirety.

The sample cell 402 may be a single pass design in which the light beam 410 from the light source 408 passes once through the gas volume of the sample cell 402 before exiting the sample cell 402. In this configuration, the optical path length is effectively the length of the sample cell 402. It is also possible to use one or more mirrors that reflect the light beam 410 such that it passes through the sample volume more than once before exiting the sample cell 402. A Herriot cell (described in detail in U.S. Pat. No. 7,679,059 B2), in which the light beam 410 is reflected between two spherical mirrors numerous times to create a very long optical path length, may also be used. The optical path length can be selected based on the strength of the absorption features being used in a measurement and the concentration of the gases being analyzed. Alternatively, a White cell, an off-axis optical resonator cavity, or an on-axis optical resonator cavity can be used.

The light source 408 may include one or more light sources that include one or more of a tunable diode laser, a tunable quantum cascade (QCL) semiconductor laser, a tunable horizontal cavity laser, a tunable vertical cavity surface emitting semiconductor laser (VCSEL), a means for nonlinear frequency generation of tunable light, or other comparable sources of light that are amendable to quantification of the amount of light absorbed as it passes through the gas sample. The light source 408 can provide a light beam having a spectrally narrower emission bandwidth than the target analyte absorption. In certain embodiments, the light source 408 includes a first light source and a second light source, in which light from the first light source and the second light source can be passed through the gas sample. A path length of light absorption for the first and the second light sources can be substantially identical. Light from the first and the second light sources can be multiplexed into a single physical path through the gas sample. Different wavelength modulation frequencies can optionally be used for the first and second light sources.

In the exemplary embodiment of FIG. 1, the light beam 410 is directed onto a photodetector 416 or other device for quantifying the intensity of incident light as the light beam 410 exits the sample cell 402. The photodetector 416 can be electronically coupled to a control unit 420 that can optionally also be electronically coupled to the light source 408 as shown in FIG. 1. The control unit 420 can include one or more processors coupled to a memory that stores instructions in computer readable code. When executed on the processor or processors, the instructions can implement a method, such as, for example, the methods described herein. Once the absorption at the target wavelength is so compensated, the control unit 420 can calculate the target analyte concentration.

If the control unit 420 is electronically connected to the light source 408, it can optionally control the light source 408. For example, if the light source 408 is a tunable diode laser, such as one of those described in U.S. Pat. No. 7,679,059 B2, the control unit can control the scan and modulation rates of the driving current for the light source 408 and also interpret the direct current measurements from the photodetector 416 to convert them to modulated 2f values.

In at least one embodiment of the present disclosure, the analyzer 400 may comprise a tunable diode laser absorption spectroscopy subsystem (TDLAS). In further embodiments, an analyzer of the present disclosure comprises, but is not be limited to: an absorption spectroscopy subsystem using a quantum cascade laser or an intraband cascade laser (ICL); an absorption spectroscopy subsystem based on dispersive infrared or non-dispersive infrared (NDIR) spectrometry; a Fourier transform infrared (FTIR) spectroscopy subsystem, a dispersive or non-dispersive ultraviolet (NDUV) spectroscopy subsystem; a cavity-enhanced absorption spectroscopy subsystem, such as those configured to enable optical-feedback cavity-enhanced absorption spectroscopy (OF-CEAS), off-axis integrated cavity-output spectroscopy (OA-ICOS), or cavity ring-down (CRD) spectroscopy techniques; a photoacoustic-based spectroscopy subsystem and/or analyzer; or a Raman spectroscopy subsystem.

Figure 2:
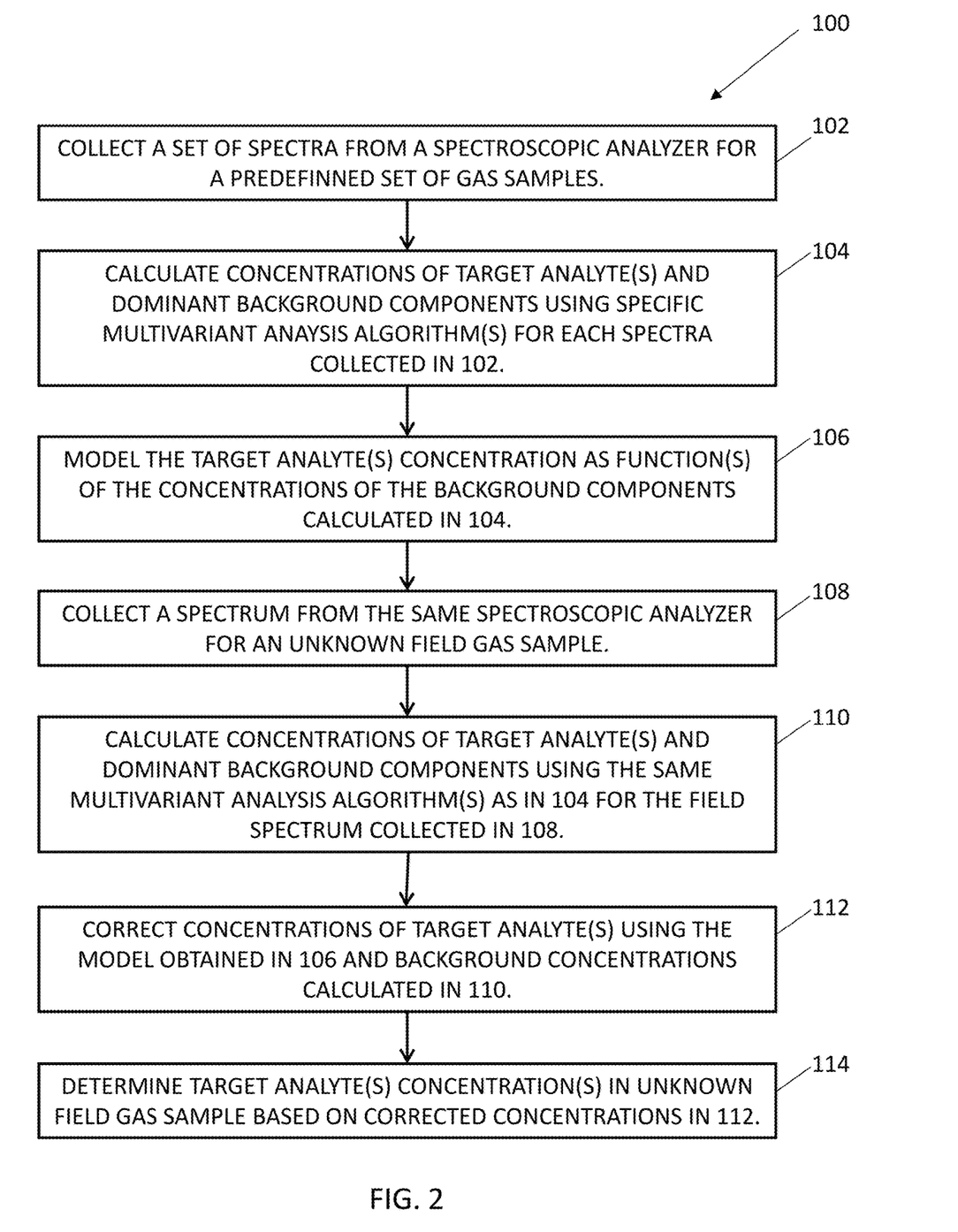
FIG. 2 is a process flowchart of a method according to the present disclosure.

According to at least one embodiment of the present disclosure, a method 100 for measuring the concentration of a target analyte in a gas mixture is shown in FIG. 2. In a step 102, a set of calibration spectra for a predefined set of calibration gas samples, respectively, are collected using a spectroscopic analyzer by scanning a sample range of wavelengths, wherein the calibration gas samples include at least one target analyte and selected background components at known concentrations.

The selected background components may include one or more components of the gas mixture other than the target analyte or target analytes. In at least one embodiment, the selected background components may be the dominant background components, e.g., background components having the greatest relative concentrations within the gas mixture. For example, such dominant background components may include background components which contribute the greatest proportion of a measurement signal or greatest proportion of light absorption when spectra are collected from calibration or field samples.

In a step 104, a first concentration of the target analyte and first concentrations of the selected background components for each calibration spectrum is calculated using at least one multivariant analysis algorithm.

In a step 106, an ideal concentration of the target analyte is modeled as a function of the first concentrations of the target analyte and selected background components using a correlative model.

In a step 108, a field spectrum for an unknown field gas sample is collected using the spectroscopic analyzer by scanning the sample range, wherein the field gas sample includes the target analyte and at least some of the selected background components. In certain implementations of the method 100, not all dominant background components may be or need be present in the field gas sample.

In a step 110, a second concentration of the target analyte and second concentrations the selected background components are calculated for the field spectrum using the same multivariant analysis algorithm(s) as in step 104.

In a step 112, the second concentration of the target analyte is corrected using the correlative model of step 106 and the second concentrations of the background components calculated in step 110.

In a step 114, a corrected target analyte concentration in the field gas sample is determined based on the corrected second concentration of the target analyte from step 112.

As non-limiting examples, the method 100 may be employed to determine the concentration of target analytes including at least one of water vapor ($H_2O$), hydrogen sulfide ($H_2S$), other sulfur compounds, hydrogen chloride (HCl), hydrogen fluoride (HF), hydrogen bromide (HBr), hydrogen cyanide (HCN), ammonia ($NH_3$), arsine ($AsH_3$), phosphine ($PH_3$), oxygen ($O_2$), carbon monoxide (CO), carbon dioxide ($CO_2$), methane ($CH_4$), ethane ($C_2H_6$), ethylene ($C_2H_4$) and acetylene ($C_2H_2$). In at least one embodiment, more than one analyte may be targeted. For example, two or more of the above-listed may be the target analytes.

In embodiments of the present disclosure, the selected background components may include hydrocarbons, hydro-fluoro-carbons, hydro-chloro-carbons, hydro-fluoro-chloro-carbons, $CO_2$, $H_2O$ and other components not targeted for analysis in a given implementation of the method 100 (e.g., the target analyte).

In embodiments of the present disclosure adapted for quality monitoring of natural gas, for example, in a pipeline, wellhead, transfer line or container, the target analyte may be: $H_2O$ only; $H_2S$ only; $H_2S$ and $H_2O$ species simultaneously; $H_2S$ and $CO_2$ species simultaneously; and $H_2S$, $H_2O$ and $CO_2$ species simultaneously. In such an embodiment, the dominant background components may include $CH_4$, $C_2H_6$ and $CO_2$, for example.

The wavelength regions of such constituents usually include not only the absorption peaks of one or more target analytes, but also the absorption peaks of background components. According to an aspect of the present disclosure, the method 100 is advantageously suitable to operate upon target wavelength regions in which both the target analytes and selected background components have substantial absorption peaks. Conventional absorption spectroscopic techniques generally avoid such regions of overlapping and interfering absorption peaks. Instead, in conventional absorption spectroscopy, wavelength regions are chosen where the target analyte has the highest peak while background species have no or the lowest peaks. For example, for measuring water vapor (i.e., $H_2O$) in natural gas (e.g., methane), the state of the art often uses 1877 nm or 1854 nm, where methane has its weakest absorption (see, e.g., U.S. Pat. No. 6,657,198 B1). Other frequently used wavelength regions having minimal interfering peaks for measuring water vapor in natural gas include at or about 1871 nm and 2735 nm, for example. As a further example, the state of the art often uses 1972 nm (see, e.g., EP 3488225 A1) for measuring hydrogen sulfide ($H_2S$) in natural gas, where background methane, carbon dioxide and water vapor interferences are minimal.

Figure 4A:
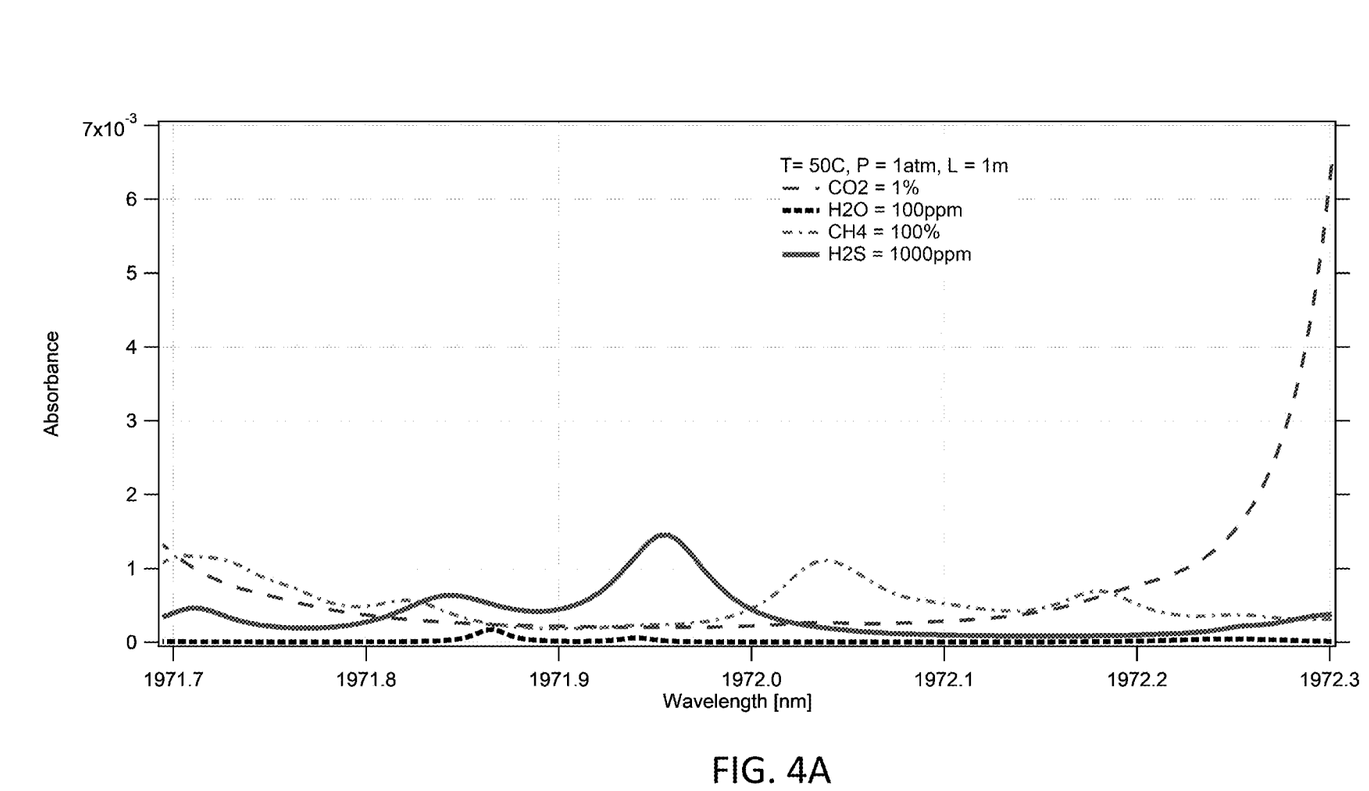
FIG. 4A shows absorption spectra of example constituents about a target wavelength of 1972 nm.

FIG. 4A illustrates such a wavelength region, in particular, the region about 1972 nm, using absorbance spectra for carbon dioxide ($CO_2$), water vapor ($H_2O$), hydrogen sulfide ($H_2S$) and methane ($CH_4$). As shown in FIG. 4A, around 1972 nm, $H_2S$ exhibits a substantial absorption peak, and other common constituents, like $CO_2$, $H_2O$ and $CH_4$, exhibit relatively low absorbance at and about 1972 nm. However, light sources (e.g., tunable diode lasers) capable of operating at or about the conventional target wavelengths known in the art are relatively expensive and, at least at times, limited in availability.

The methods according to the present disclosure enable the use of target wavelength regions in which the target analyte may have strong interferences from the selected background components. In at least one embodiment, the target wavelength may be, e.g., 1371 nm, where methane interference with water vapor is much stronger, but suitable laser light sources are much less expensive and generally more commercially available than an 1877 or 1854 nm counterpart. As a further non-limiting example, the methods of the present disclosure enable the use of 1944 nm as a target wavelength, and of many other wavelengths, where the background interferences are relatively strong, but suitable lasers are more widely available.

Figure 4B:
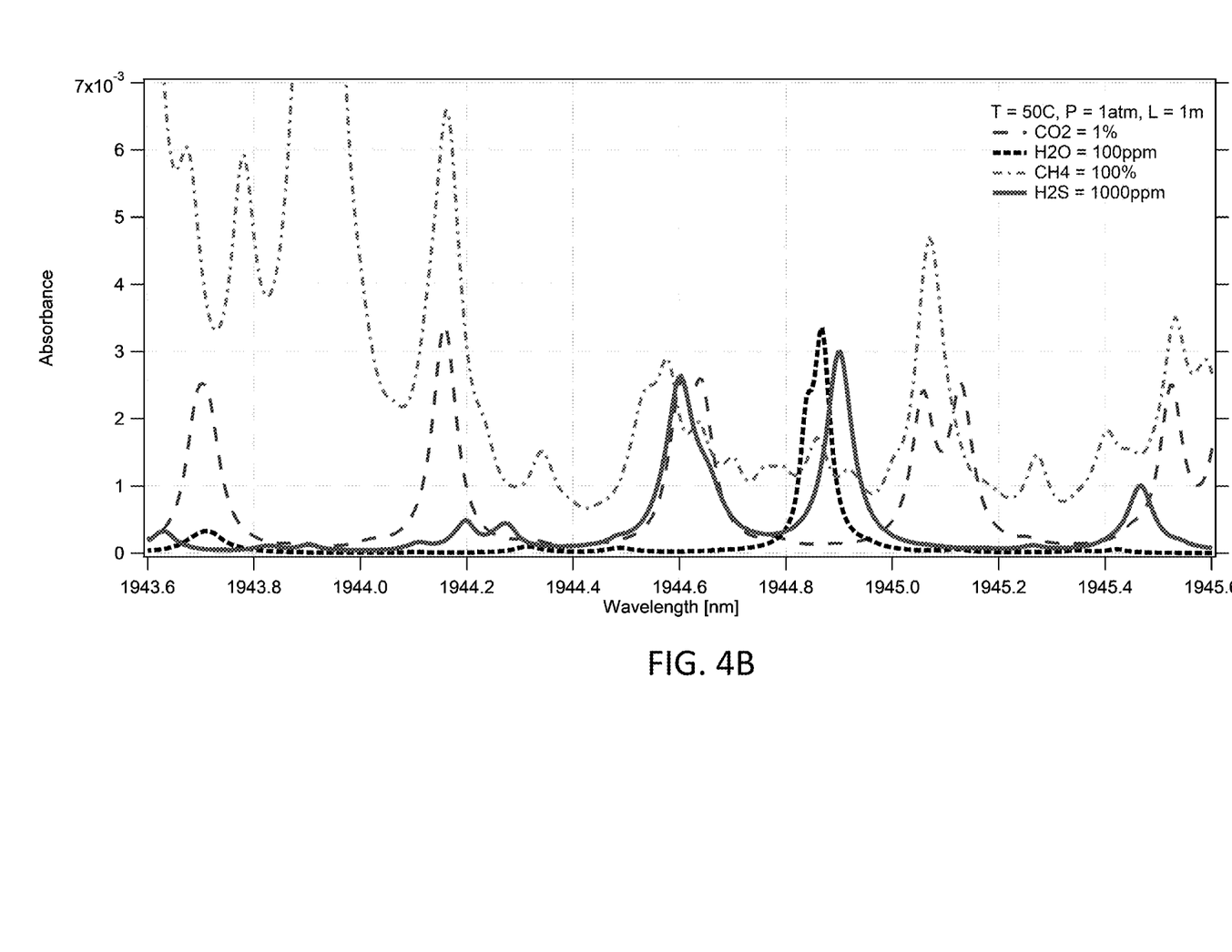
FIG. 4B shows absorption spectra of example constituents about a target wavelength of 1944.6 nm according to the present disclosure.

FIG. 4B depicts the absorption spectra for carbon dioxide ($CO_2$), water vapor ($H_2O$), hydrogen sulfide ($H_2S$) and methane ($CH_4$) about a target wavelength of 1944.6 nm. As shown in FIG. 4B, each of $H_2S$, $CO_2$, $H_2O$ and $CH_4$ exhibit substantial absorption peaks with considerable overlap in the region around 1944-1945 nm. The methods of the present disclosure enable quantification of target analytes despite substantial overlapping spectral peaks with interfering background components by modeling and thereby correcting the interferences of the background components.

In embodiments of the present disclosure adapted for quality monitoring of natural gas, the sample range of wavelengths scanned by the light source of the spectroscopic analyzer may include, but not be limited to, to +/-1 nanometer (nm) around a target wavelength of 1371.0 nm, 1392.5 nm, 1565.4 nm, 1569.9 nm, 1574.6 nm, 1576.3 nm, 1590.0 nm, 1871.1 nm, 1877.1 nm, 1914.1 nm, 1916.5 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm, and 2665.1 nm. In at least one embodiment, the sample range of wavelengths may consist of +/-1 nanometer (nm) around a target wavelength of at least one of: 1371.0 nm, 1565.4 nm, 1569.9 nm, 1574.6 nm, 1576.3 nm, 1590.0 nm, 1914.1 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm, and 2665.1 nm.

In the step 102, the predefined set of calibration gas samples may be generated in a laboratory setting by mixing premixed gas mixture(s) and pure gases from certified sources (e.g., bottles) or may be generated in the field by field gas streams. For example, the set of gas samples can be defined using Design of Experiments (DOE) covering the entire variation ranges of the target analyte (e.g., 0-400 ppm $H_2O$ and 0-20 ppm $H_2S$) and background components (e.g., 50-100% methane, 0-20% ethane, 0-20% $CO_2$, 0-10% heavier alkanes, and/or $N_2$, $O_2$, $H_2$ etc.).

In steps 104 and 110, the multivariate analysis algorithm includes, but are not limited to, a classical least squares regression (CLS), a partial least square regression (PLS), a multivariate linear regression (MLR), an inverse least square regression (ILS), artificial neural network (ANN) and machine learning (ML).

In at least one embodiment, the calculation of the concentrations of multiple components, including the target analyte(s) and the selected background components, can be performed using one single multivariate analysis algorithm applied over the same, single session (e.g., numerical analysis of at least a portion of the spectral data) of the measured spectra. For example, as in FIG. 3, the ppm level of $H_2S$ and percentages of $CO_2$, $CH_4$ and $C_2H_6$ can be calculated simultaneously using a single multivariate analysis algorithm, such as PLS or CLS, for example. Such a calculation may use the entire measured spectra between index 0 and 512 (in arbitrary units), as illustrated in FIG. 3.

In an alternative embodiment, one or more component concentration(s) can be calculated using a first multivariate analysis algorithm in a first session of the measured spectra (e.g., first calculation). The remaining one or more concentration(s) can be calculated using additional multivariate analysis algorithms, for example, a second (and a third) multivariate analysis algorithm and a corresponding second (and third) session(s) of the measured spectra (e.g., second and third calculations). In such embodiments, the first, second and third algorithms, for example, can be mathematically the same or different. The first, second and third session(s) of measured spectra, for example, can be the same, different, or partially overlap with one another, as shown in FIG. 3 in the overlap between Session 1 and Session 2. The first, second and third calculations, for example, can be performed in parallel, simultaneously, or completely independent from each other.

In at least one embodiment, calculations with the second or third algorithm, for example, and corresponding spectra session use the resultant component concentration(s) from the first calculation or vice versa.

As illustrated in FIG. 2, Session 1 of the measured spectra (on the left), from index 50 to 320, can be used to calculate percentage compositions of $CO_2$, $CH_4$ and $C_2H_6$ using PLS. The Session 2 of the measured spectra (on the right), from index 260 to 480, can be used to calculate concentration level (e.g., ppm) of $H_2S$ with CLS. And the concentrations or percentage compositions of $CH_4$ and $C_2H_6$ calculated using PLS in Session 1 can be fed into the CLS calculation of $H_2S$ using CLS in Session 2.

In step 106, the ideal (e.g., theoretical) target analyte concentration is modeled as one or more function(s) of the first concentrations of the target analytes and the selected background components calculated in step 104. Such functions can be linear or nonlinear, derived using any multivariate analysis methods, such as classical least square regression (CLS), a multivariate linear regression (MLR), a partial least square regression (PLS) and the like. The multivariate analysis methods used may be the same or different than those used in step 104.

Such an exemplary mathematical model equation may have the form:

$$R_i = f(R_1, \text{background composition}),$$

where $R_i$ represents the ideal concentration of the target analyte, and $R_1$ represents the first concentration of the target analyte from step 104.

For example, where there are two target analytes, e.g., $H_2S$ and $H_2O$, in a natural gas stream:

$$R_{i\_H2S} = R_{1\_H2S} \cdot \text{scaler}_{H2S},$$

where $$\text{scaler}_{H2S} = \alpha_1 \cdot [CH_4]_1 + \alpha_2 \cdot [C_2H_6]_1 + \alpha_3 \cdot [CO_2]_1;$$

and $$R_{i\_H2O} = R_{1\_H2O} \cdot \text{scaler}_{H2O},$$

where $$\text{scaler}_{H2O} = \beta_1 \cdot [CH_4]_1 + \beta_2 \cdot [C_2H_6]_1 + \beta_3 \cdot [CO_2]_1.$$

In such a formulation of the model, $[CH_4]_1$, $[C_2H_6]_1$ and $[CO_2]_1$ are the first concentrations of the selected background components calculated from step 104.

In step 112, the second concentration of the target analyte is corrected using the correlative model of step 106 and the second concentrations of the background components calculated in step 110. Accordingly, the exemplary mathematical model equation has the form:

$$R_c = f(R_2, \text{background composition}),$$

where $R_c$ represents the corrected concentration of the target analyte determined in step 114, and $R_2$ represents the second concentration of the target analyte calculated in step 110.

For example, proceeding from the prior example, where the two target analytes are $H_2S$ and $H_2O$ in a natural gas stream:

$$R_{c\_H2S} = R_{2\_H2S} \cdot \text{scaler}_{H2S},$$

where $$\text{scaler}_{H2S} = \alpha_1 \cdot [CH_4]_2 + \alpha_2 \cdot [C_2H_6]_2 + \alpha_3 \cdot [CO_2]_2;$$

and $$R_{c\_H2O} = R_{2\_H2O} \cdot \text{scaler}_{H2O},$$

where $$\text{scaler}_{H2O} = \beta_1 \cdot [CH_4]_1 + \beta_2 \cdot [C_2H_6]_2 + \beta_3 \cdot [CO_2]_2$$

In such a formulation of the model, $[CH_4]_2$, $[C_2H_6]_2$ and $[CO_2]_2$ are the second concentrations of the selected background components calculated in step 110.

In embodiments of the analyzer 400 according to the present disclosure, the model or models are loaded into the memory of the control unit 420 to be applied to field spectra for later real-time measurements in the field. The model(s) can be updated in the field by downloading a new model into the memory 420.

While various embodiments of a spectroscopic analyzer and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. A method, comprising:
   collecting a set of calibration spectra for a predefined set of calibration gas samples, respectively, using a spectroscopic analyzer by scanning a sample range of wavelengths, wherein the gas samples include a target analyte and selected background components;
   calculating a first concentration of the target analyte and first concentrations of the selected background components for each calibration spectrum using at least one multivariate analysis algorithm;
   modeling an ideal concentration of the target analyte as a function of the first concentrations of the target analyte and the selected background components using a correlative model;
   collecting a field spectrum for a field gas sample using the spectroscopic analyzer by scanning the sample range, wherein the field gas sample includes the target analyte and at least some of the selected background components;
   calculating a second concentration of the target analyte and second concentrations of the selected background components for the field spectrum using the at least one multivariate analysis algorithm;
   correcting the second concentration of the target analyte using the correlative model and the second concentrations of the background components; and
   determining a corrected target analyte concentration in the field gas sample based on the corrected second concentration of the target analyte.

2. The method of claim 1, wherein the target analyte is at least one of water ($H_2O$), hydrogen sulfide ($H_2S$), and carbon dioxide ($CO_2$).

3. The method of claim 1, wherein the target analyte is at least one of water vapor ($H_2O$), hydrogen sulfide ($H_2S$), other sulfur compounds, hydrogen chloride (HCl) (HCl), hydrogen fluoride (HF), hydrogen bromide (HBr), hydrogen cyanide (HCN), ammonia ($NH_3$), arsine ($AsH_3$), phosphine ($PH_3$), oxygen ($O_2$), carbon monoxide (CO), carbon dioxide ($CO_2$), methane ($CH_4$), ethane ($C_2H_6$), ethylene ($C_2H_4$), and acetylene ($C_2H_2$).

4. The method of claim 1, wherein the selected background components include at least one of methane ($CH_4$), ethane ($C_2H_6$), heavier alkanes ($C_nH_{2n+2}$), carbon monoxide (CO), carbon dioxide ($CO_2$), elemental nitrogen ($N_2$), elemental oxygen ($O_2$), elemental hydrogen ($H_2$), heavier hydrocarbons, hydro-fluoro-carbons, hydro-chloro-carbons, and hydro-fluoro-chloro-carbons.

5. The method of claim 1, wherein the at least one multivariate analysis algorithm and/or the correlative model include at least one of a classical least square regression (CLS), a partial least square regression (PLS), a multivariate linear regression (MLR), an inverse least square regression (ILS), an artificial neural network and a machine learning algorithm.

6. The method of claim 1, wherein:
spectra of the set of calibration spectra are collected and/or analyzed during more than one session;
each session includes a subrange of wavelengths of the sample range;
the at least one multivariate analysis algorithm includes a first algorithm and at least one further algorithm, each applied to spectra of a different session;
the first algorithm is used to calculate the first concentration of the target analyte and/or the first concentration of at least one of the selected background components; and
the at least one further algorithm is used to calculate the first concentrations of other background components of the selected background components.

7. The method of claim 6, wherein the subranges of the sessions do not overlap each other.

8. The method of claim 6, wherein the subranges of the sessions at least partially overlap each other.

9. The method of claim 6, wherein each of the at least one multivariate analysis algorithm is mathematically the same algorithm.

10. The method of claim 6, wherein at least one of the at least one multivariate analysis algorithm is a different algorithm mathematically.

11. The method of claim 6, wherein the at least one further algorithm operates upon the first concentration of the target analyte and/or the first concentrations of at least one of the selected background components calculated using the first algorithm.

12. The method of claim 1, wherein the modeling yields a correlation between the ideal concentrations and the first concentrations of the target analyte using the first concentrations of the selected background components, wherein the correlation results from structural interference and collisional broadening effects.

13. The method of claim 1, wherein the sample range of wavelengths scanned by the spectroscopic analyzer consists of +/−1 nanometer (nm) around a target wavelength of at least one of: 1371.0 nm, 1565.4 nm, 1569.9 nm, 1574.6 nm, 1576.3 nm, 1590.0 nm, 1914.1 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm, and 2665.1 nm.

14. An apparatus comprising:
a spectroscopic analyzer adapted to scan a sample range of wavelengths; and computer hardware including a programmable processor and memory storage, wherein the computer hardware is configured to perform operations comprising:
collecting a set of calibration spectra for a predefined set of calibration gas samples, respectively, using the spectroscopic analyzer by scanning the sample range of wavelengths, wherein the gas samples include a target analyte and selected background components;
calculating a first concentration of the target analyte and first concentrations of the selected background components for each calibration spectrum using at least one multivariate analysis algorithm;
modeling the ideal concentration of the target analyte as a function of the first concentrations of the target analyte and the selected background components using a correlative model;
collecting a field spectrum for a field gas sample using the spectroscopic analyzer by scanning the sample range, wherein the field gas sample includes the target analyte and at least some of the selected background components;
calculating a second concentration of the target analyte and second concentrations of the selected background components for the field spectrum using the at least one multivariate analysis algorithm;
correcting the second concentration of the target analyte using the correlative model and the second concentrations of the background components; and
determining a corrected target analyte concentration in the field gas sample based on the corrected second concentration of the target analyte.

15. The apparatus of claim 14, wherein the spectroscopic analyzer includes an absorption spectroscopy subsystem, comprising a tunable diode laser.

16. The apparatus of claim 14, wherein the spectroscopic analyzer includes a Raman spectroscopy subsystem.

17. The apparatus of claim 14, wherein the spectroscopic analyzer includes at least one: an absorption spectroscopy subsystem comprising a tunable diode laser, a quantum cascade laser or an intraband cascade laser (ICL); an absorption spectroscopy subsystem based on dispersive infrared or non-dispersive infrared (NDIR) spectrometry, Fourier transform infrared spectroscopy subsystem (FTIR), dispersive or non-dispersive ultraviolet (NDUV) spectroscopy subsystem; a cavity-enhanced absorption spectroscopy subsystem configured to enable optical-feedback cavity-enhanced absorption spectroscopy (OFCEAS), off-axis integrated cavity-output spectroscopy (OA-ICOS), or cavity ring-down (CRD) spectroscopy techniques; photoacoustic-based spectroscopy subsystem and/or analyzer; a dual-comb spectroscopy subsystem; and a Raman spectroscopy subsystem.

18. The apparatus of claim 14, wherein the spectroscopic analyzer includes a gas sampling subsystem configured to extract the field gas sample from a gas source, wherein the gas source is contained within a pipeline.

19. The apparatus of claim 14, wherein the sample range of wavelengths the spectroscopic analyzer is adapted to scan consists of +/−1 nm around a target wavelength of at least one of: 1371.0 nm, 1565.4 nm, 1569.9 nm, 1574.6 nm, 1576.3 nm, 1590.0 nm, 1914.1 nm, 1916.7 nm, 1919.3 nm, 1922.1 nm, 1925.0 nm, 1928.0 nm, 1939.9 nm, 1944.6 nm, 1982.3 nm, 2583.9 nm, 2650.1 nm, and 2665.1 nm.

20. A computer program product comprising a non-transitory machine-readable storage medium encoding instructions that, when executed by at least one programmable processor, cause the at least one programmable processor to perform operations comprising:
collecting a set of calibration spectra for a predefined set of calibration gas samples, respectively, using a spectroscopic analyzer by scanning a sample range of wavelengths, wherein the gas samples include a target analyte and selected background components;
calculating a first concentration of the target analyte and first concentrations of the selected background components for each calibration spectrum using at least one multivariate analysis algorithm;

modeling the ideal concentration of the target analyte as a function of the first concentrations of the target analyte and the selected background components using a correlative model;

collecting a field spectrum for a field gas sample using the spectroscopic analyzer by scanning the sample range, wherein the field gas sample includes the target analyte and at least some of the selected background components;

calculating a second concentration of the target analyte and second concentrations of the selected background components for the field spectrum using the at least one multivariate analysis algorithm;

correcting the second concentration of the target analyte using the correlative model and the second concentrations of the background components; and determining a corrected target analyte concentration in the field gas sample based on the corrected second concentration of the target analyte.

\* \* \* \* \*